US011892156B1

(12) United States Patent
Park

(10) Patent No.: US 11,892,156 B1
(45) Date of Patent: Feb. 6, 2024

(54) CHEERING TOOL STRUCTURE

(71) Applicant: Young Park, Incheon (KR)

(72) Inventor: Young Park, Incheon (KR)

( * ) Notice: Subject to any disclaimer, the term of this patent is extended or adjusted under 35 U.S.C. 154(b) by 0 days.

(21) Appl. No.: 18/144,831

(22) Filed: May 8, 2023

(30) Foreign Application Priority Data

Oct. 21, 2022 (KR) ........................ 10-2022-0136126

(51) Int. Cl.
*F21V 7/00* (2006.01)
*F21V 21/088* (2006.01)
*F21V 33/00* (2006.01)

(52) U.S. Cl.
CPC ........ *F21V 7/0025* (2013.01); *F21V 21/0885* (2013.01); *F21V 33/008* (2013.01)

(58) Field of Classification Search
CPC ... F21V 7/0025; F21V 21/0885; F21V 33/008
See application file for complete search history.

(56) References Cited

U.S. PATENT DOCUMENTS 5,388,039 A * 2/1995 Dolph .................... A01K 85/01 250/462.1
2013/0264966 A1* 10/2013 Hazawa .................... G09F 9/33 315/297
2020/0327833 A1* 10/2020 Ahn ......................... G09G 3/14

FOREIGN PATENT DOCUMENTS

KR 10-2018-0079976 A 7/2018
KR 20-2018-0002177 U 7/2018

OTHER PUBLICATIONS

KR200409681Y1, Mar. 2006, KR reference and Search translation. (Year: 2006).*
CN-210800769-U, Jun. 2020, CN reference and Search translation. (Year: 2020).*

* cited by examiner

*Primary Examiner* — Laura K Tso
(74) *Attorney, Agent, or Firm* — Revolution IP, PLLC

(57) ABSTRACT

According to the present invention, there is provided a cheering tool structure including: a light collection unit mounted on a light portion of a smartphone or a flash device to collect light emitted from the light portion; a light delivery unit which extends upward from an upper portion of the light collection unit to deliver the light collected by the light collection unit; and a radiation unit installed at an end of the light delivery unit to radiate the light delivered through the light delivery unit.

7 Claims, 10 Drawing Sheets

[FIG. 1]
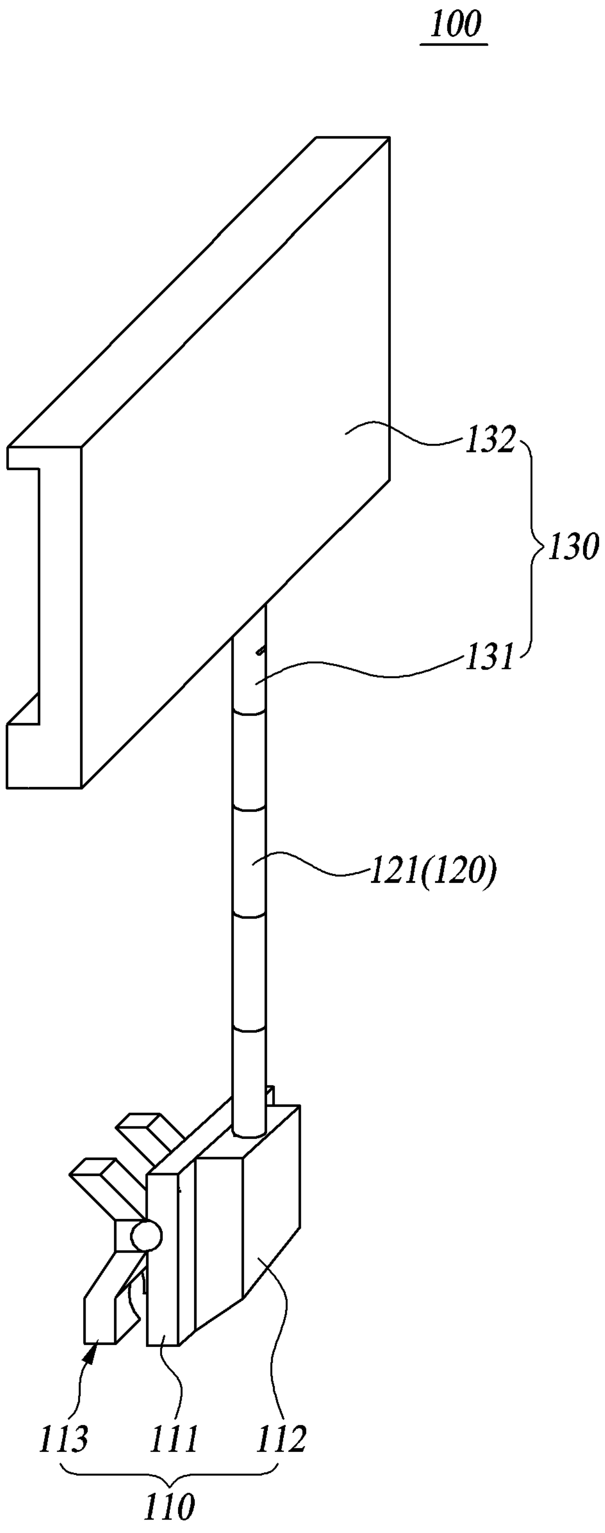

[FIG. 2]
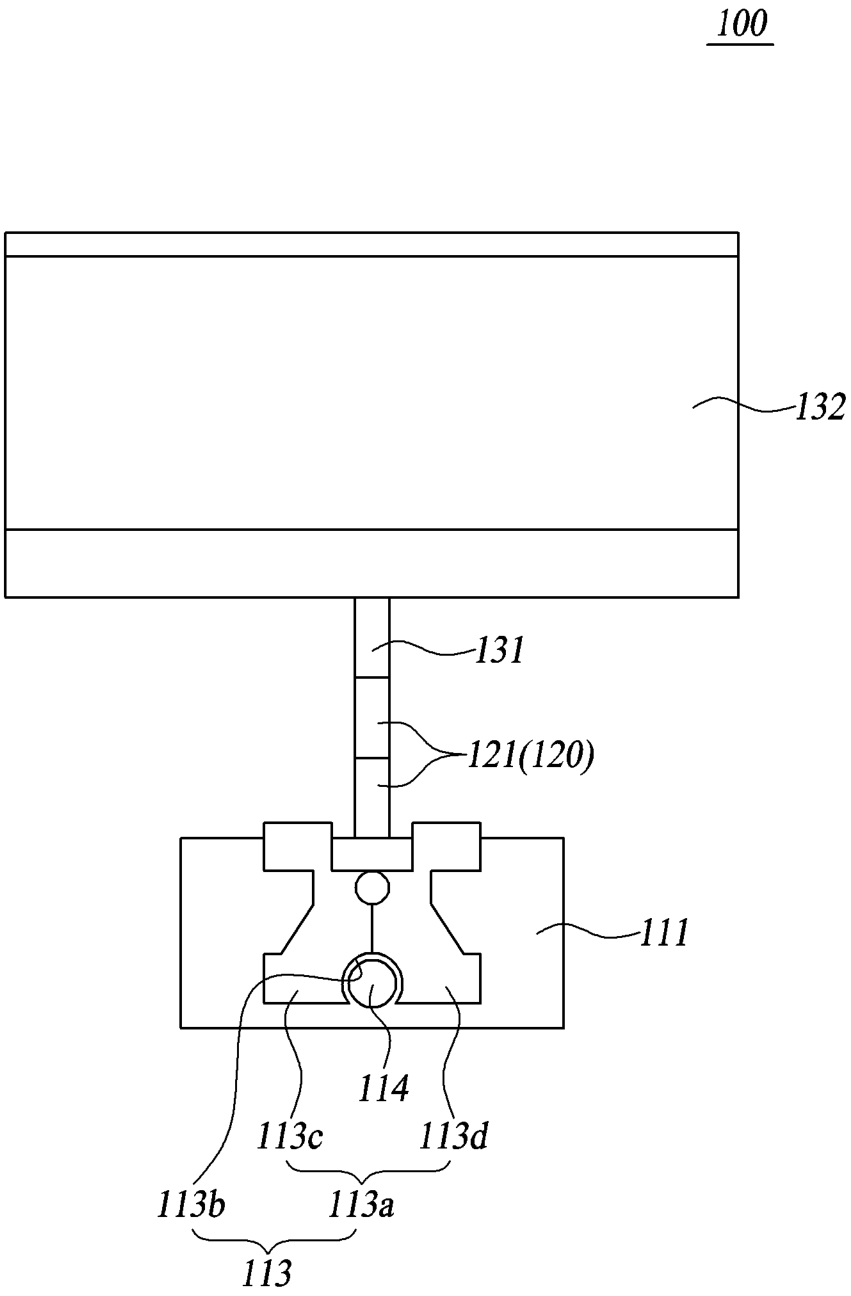

[FIG. 3]
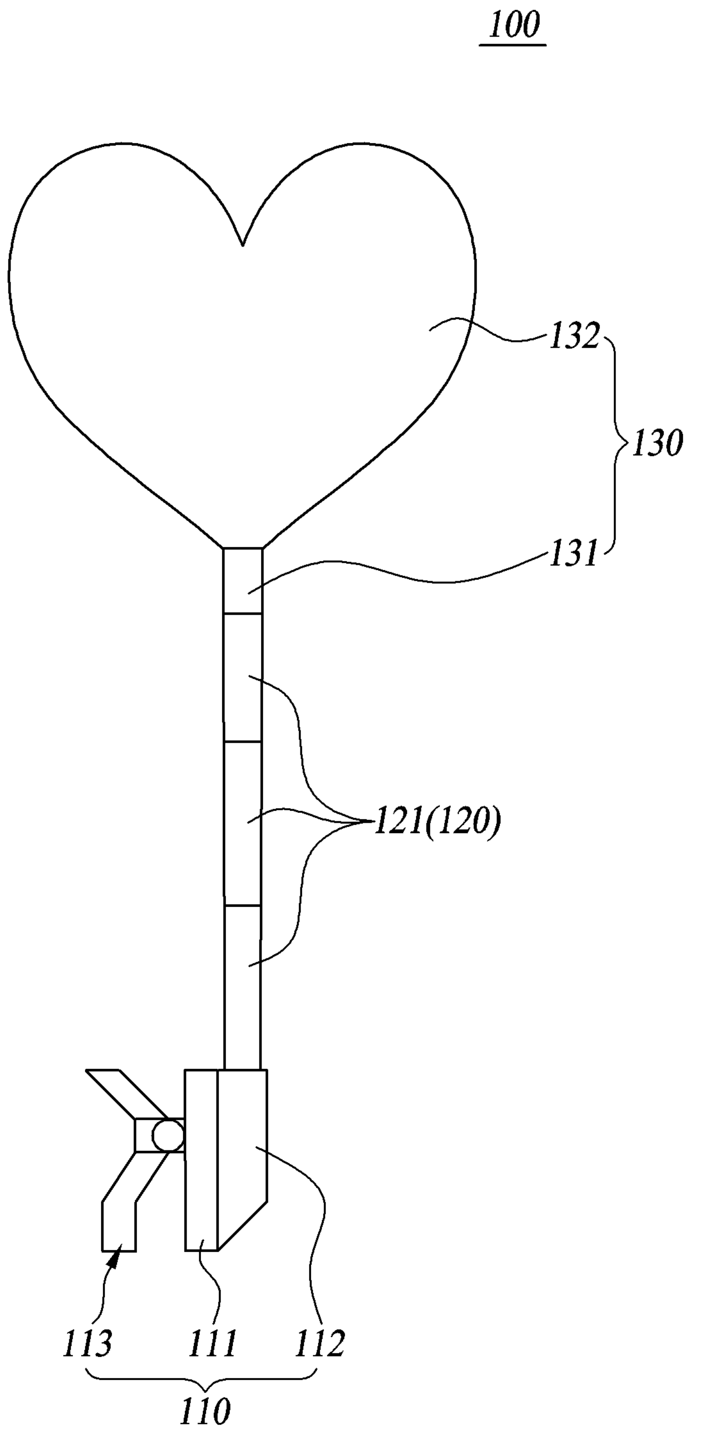

[FIG. 4]
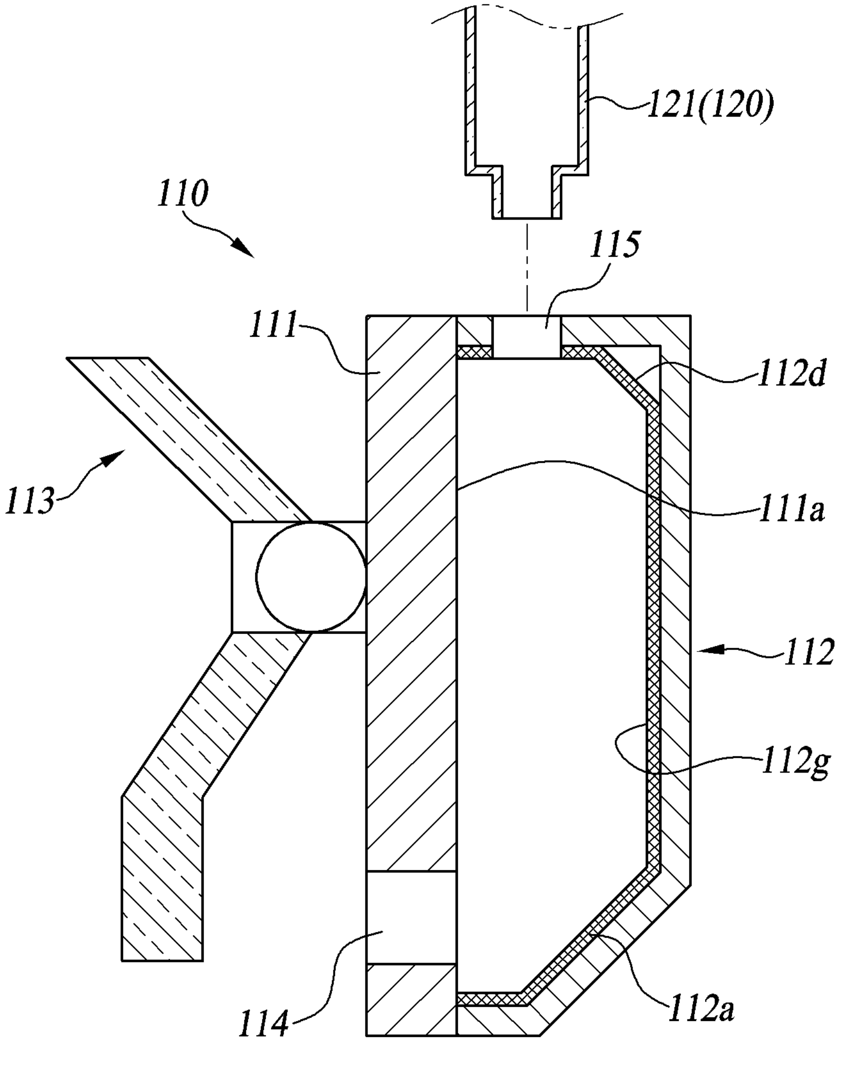

[FIG. 5]
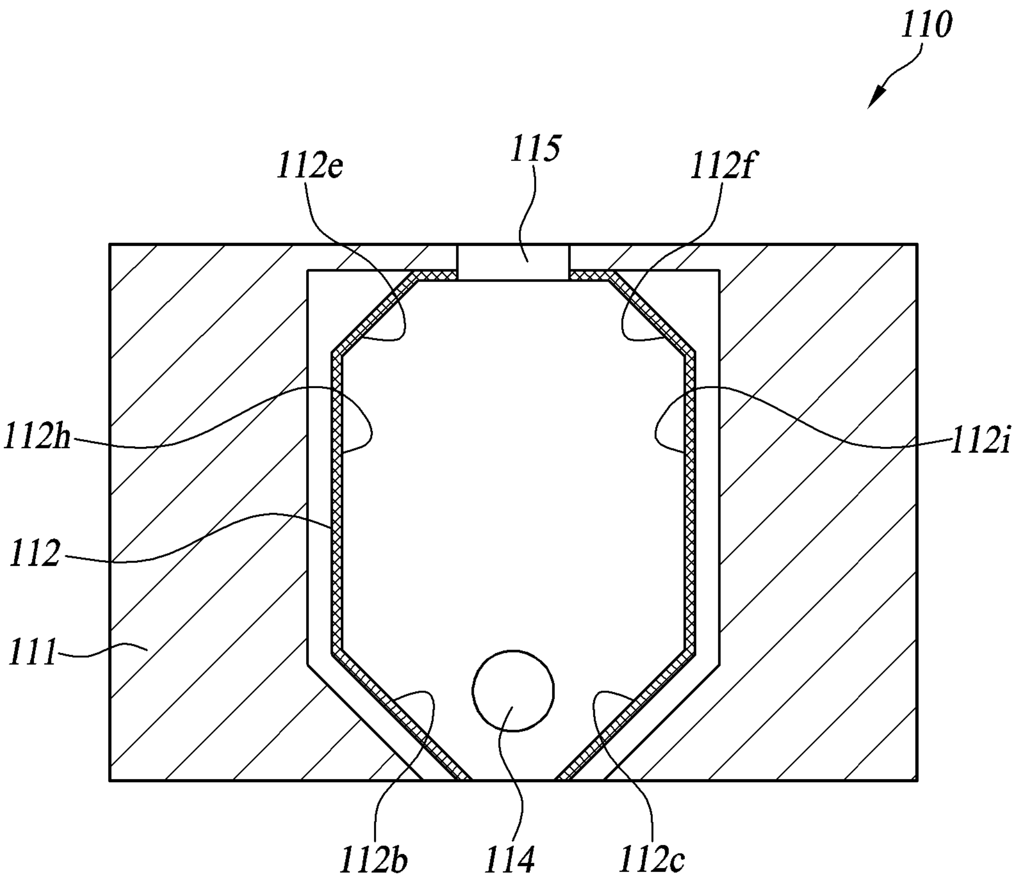

[FIG. 6]
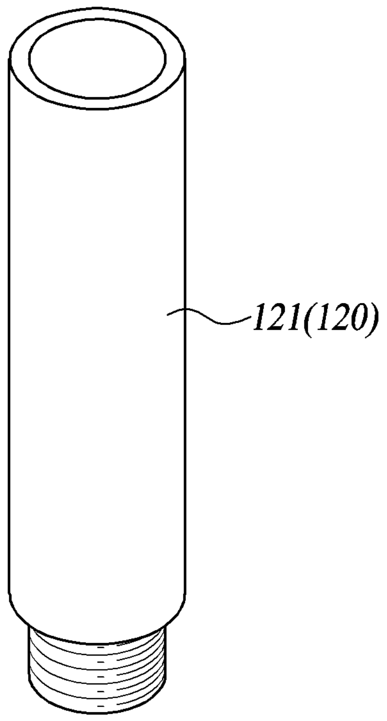

[FIG. 7]
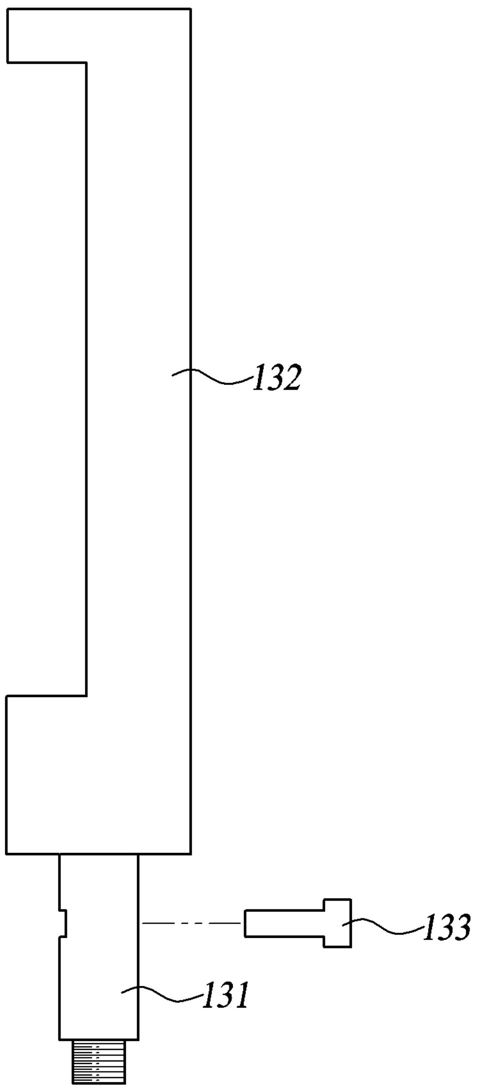

[FIG. 8]
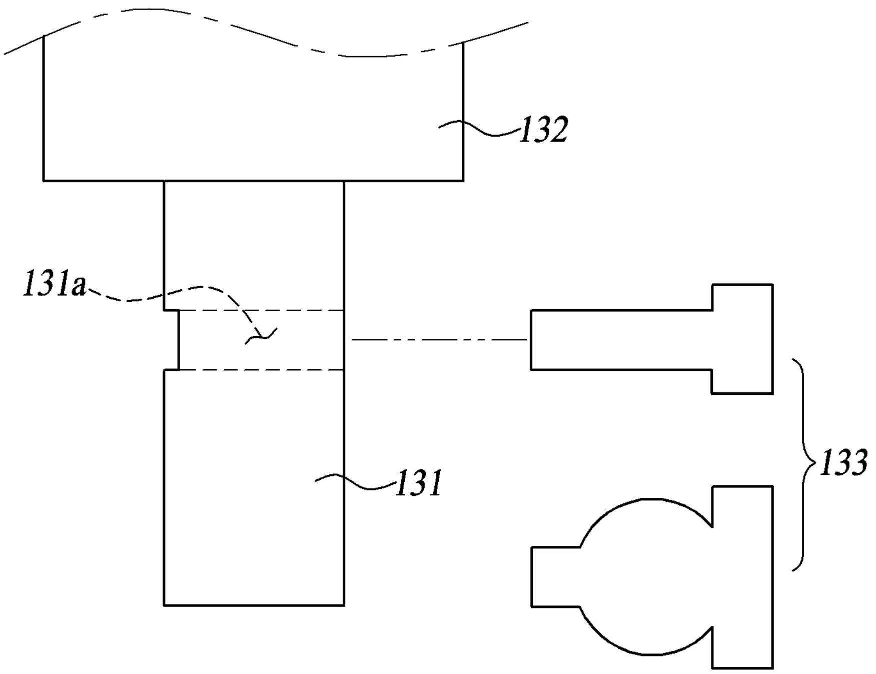

[FIG. 9]
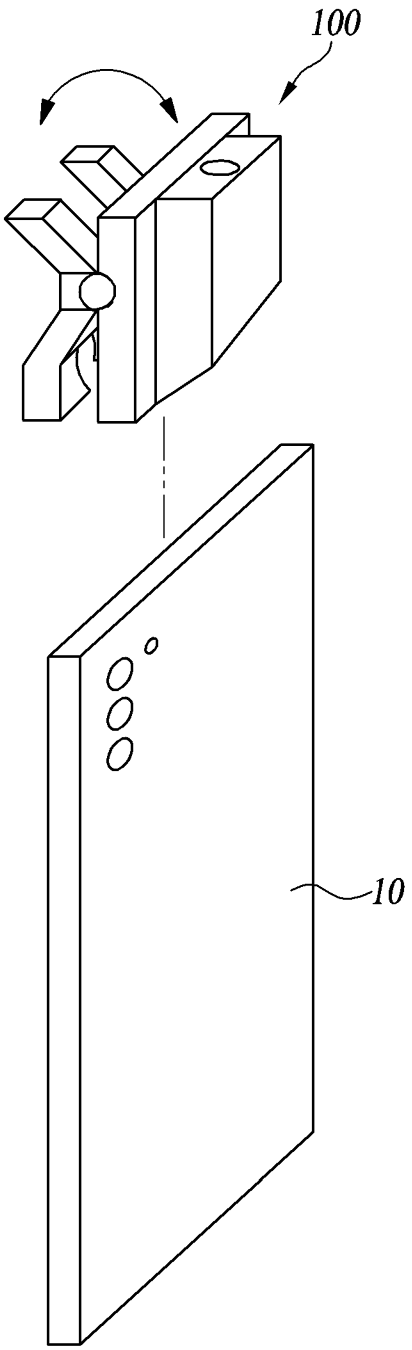

[FIG. 10]
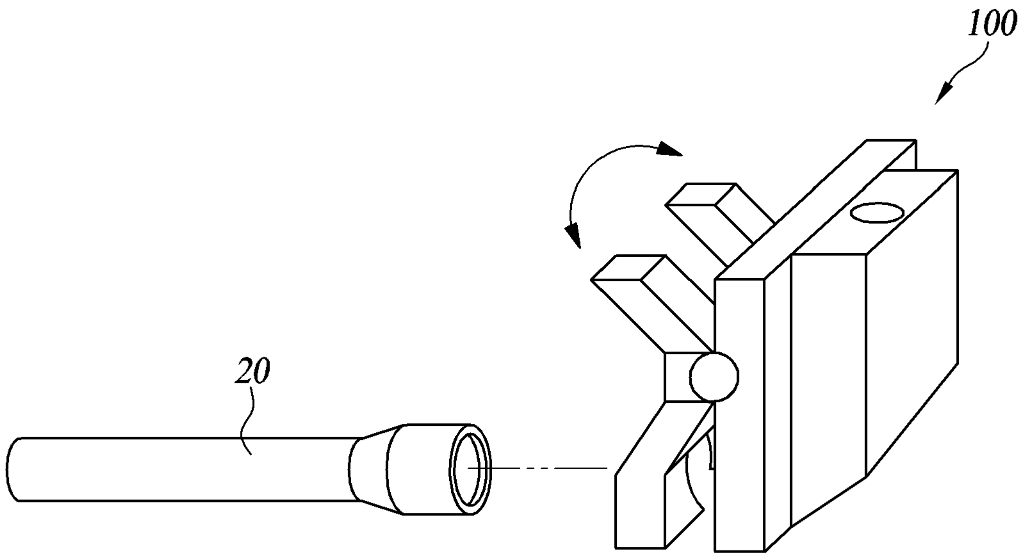

CHEERING TOOL STRUCTURE

CROSS REFERENCE TO RELATED APPLICATIONS

This application claims the priority benefit of Korean Patent Application No. 10-2022-0136126 filed on Oct. 21, 2022, the entirety of which is incorporated by reference herein.

BACKGROUND OF THE INVENTION

1. Field of the Invention

The present invention relates to a cheering tool structure, and more particularly, to a cheering tool structure capable of producing various cheering effects by delivering light collected in a light collection unit to a radiation unit having various replaceable shapes and structures through an extendable light delivery unit and radiating the light by the radiation unit to an outside, in a state where the light collection unit is mounted on a light portion of a smartphone or other flash devices.

2. Description of the Related Art

In general, a cheering tool has various shapes such as a rod, a heart, a star or a cheering phrase (name) shape.

Here, in the case of a cheering tool having a rod, a heart or a star shape, there is a problem in that the shape cannot be easily replaced, and in the case of a cheering tool having a cheering phrase (name) shape, there is a problem in that the cheering phrase (name) cannot be easily changed to desired contents.

Therefore, in order to solve the above-described problems, cheering tools having a light emitting source are disclosed in the art as the following prior art documents. These cheering tools have a configuration in which a light-emitting function of LED or luminous light is added to various shapes.

However, even in the case of the conventional cheering tool having the light emitting source, it is not possible to replace the shape, and a weight of the tool is increased due to weights of the light emitting source and the battery, thereby causing a deterioration in terms of portability and usability.

Therefore, under conditions where cheering tools having various shapes are used according to the recent revitalization of performance culture, the need for a cheering tool having a replaceable shape with a light weight is emerging.

PRIOR ART DOCUMENT

Patent Document (Patent Document 1) Korean Utility Model Laid-Open Publication No. 20-2018-0002177
(Patent Document 2) Korean Patent Laid-Open Publication No. 10-2018-0079976

SUMMARY OF THE INVENTION

Accordingly, an object of the present invention is to provide a cheering tool structure capable of producing various cheering effects by delivering light collected in a light collection unit to a radiation unit having various replaceable shapes and structures through an extendable light delivery unit and radiating the light by the radiation unit to an outside, in a state where the light collection unit is mounted on a light portion of a smartphone or other flash devices.

Meanwhile, the objects of the present invention are not limited to those described above, and other objects not described in this disclosure will be clearly understood by those skilled in the art from the following description.

To achieve the above object, according to an aspect of the present invention, there is provided a cheering tool structure including: a light collection unit mounted on a light portion of a smartphone or a flash device to collect light emitted from the light portion; a light delivery unit which extends upward from an upper portion of the light collection unit to deliver the light collected by the light collection unit; and a radiation unit installed at an end of the light delivery unit to radiate the light delivered through the light delivery unit.

Here, preferably, the light collection unit includes: a light collecting panel; a light collecting housing disposed on a rear surface of the light collecting panel to define a predetermined space, and configured to receive, collect and deliver the light introduced from the light portion of the smartphone or the flash device; a mounting clamp installed on the front of the light collecting panel to mount or hold the light collecting panel on the light portion of the smartphone or the flash device; a light inlet hole which is formed on a lower side of the light collecting panel so that the light portion of the smartphone or the flash device brings into close contact or is inserted, thus to introduce the light into the light collecting housing; and a light outlet hole formed in an upper surface of the light delivery unit, to which one end of the light delivery unit is coupled, thus to guide the light collected by the light collecting housing toward the light delivery unit.

In addition, preferably, the light collecting housing provides the space by a plurality of walls together with a rear surface of the light collecting panel, wherein the walls include: a first lower inclined wall, a second lower inclined wall, and a third lower inclined wall configured to reflect the light introduced into a lower section of the space through the light inlet hole to an upper section of the space; a first upper inclined wall, a second upper inclined wall, and a third upper inclined wall configured to reflect the light, which is not delivered to the light outlet hole among the light reflected to the upper section of the space through the first lower inclined wall to the third lower inclined wall, to the lower section of the space; and a first intermediate wall, a second intermediate wall, and a third intermediate wall located between the light inlet hole and the light outlet hole.

Further, preferably, the mounting clamp includes: a clamp pin installed on the front of the light collecting panel to be pivoted and restored by an elastic force; and holding parts formed at a lower portion of the clamp pin so that the clamp pin is directly hung and mounted on the light portion of the flash device.

Further, preferably, the clamp pin includes a pair of clamp claws facing each other, which are configured to be rotated and restored by an elastic force about a center thereof.

Further, preferably, the light delivery unit includes a light delivery tube having a cylindrical structure in which one or more tubes having a predetermined length are separately connected in series; and the light delivery tube includes one end coupled to the light outlet hole and the other end coupled to the radiation unit, and has a cylindrical or semi-cylindrical shape.

Further, preferably, the radiation unit includes: a coupling tube whose one end is coupled to the other end of the light delivery tube; a light emitting unit which extends from the other end of the coupling tube to diffuse the light delivered through the coupling tube, and has any one shape of rod, heart and star shapes.

Furthermore, preferably, the radiation unit includes: a coupling tube whose one end is coupled to the other end of the light delivery tube; a projection plate which extends from the other end of the coupling tube and is irradiated with the light delivered through the coupling tube; and a projection slide which is inserted into an insertion slot formed in the coupling tube in a replaceable manner, and has a cheering phrase, name or design printed thereon so that the cheering phrase, name or design is projected onto the projection plate by the light delivered through the coupling tube.

Therefore, according to the present invention, it is possible to produce various cheering effects by delivering light collected in a light collection unit to a radiation unit having various replaceable shapes and structures through the extendable light delivery unit and radiating the light by the radiation unit to an outside, in a state where the light collection unit is mounted on the light portion of the smartphone or other flash devices.

Meanwhile, the effects of the present invention are not limited to the advantages described above, and other effects not described in this disclosure will be clearly understood by those skilled in the art from the description of the claims.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a cheering tool structure according to a preferred embodiment of the present invention;

FIGS. 2 and 3 are a front view and a side view illustrating the cheering tool structure shown in FIG. 1, respectively;

FIGS. 4 and 5 are a cross-sectional view and a longitudinal-sectional view illustrating the configuration of a light collection unit shown in FIG. 1, respectively;

FIG. 6 is a view illustrating the configuration of a light delivery unit shown in FIG. 1;

FIGS. 7 and 8 are views illustrating the configuration of a radiation unit shown in FIG. 1, respectively; and FIGS. 9 and 10 are perspective views illustrating a state where the cheering tool structure shown in FIG. 1 is mounted on a light portion of a smartphone and a flash device, respectively.

DETAILED DESCRIPTION OF THE INVENTION

Hereinafter, preferred embodiments of the present invention will be described in detail with reference to the accompanying drawings.

As shown in FIGS. 1 to 10, a cheering tool structure 100 according to a preferred embodiment of the present invention includes: a light collection unit 110 mounted on a light portion of a smartphone 10 or a flash device 20 to collect light emitted from the light portion; a light delivery unit 120 which extends upward from an upper portion of the light collection unit 110 to deliver the light collected by the light collection unit 110; and a radiation unit 130 installed at an end of the light delivery unit 120 to emit and radiate the light delivered through the light delivery unit 120 to an outside.

The light collection unit 110 is mounted on the light portion of the smartphone 10 or other flash device 20 as a means for collecting light, and includes: a light collecting panel 111 having a square panel shape; a light collecting housing 112 disposed on a rear surface of the light collecting panel 111 to define a predetermined space, and configured to receive, collect and deliver the light introduced from the light portion of the smartphone 10 or other flash device 20, a mounting clamp 113 installed on the front of the light collecting panel 111 to mount or hold the light collecting panel 111 on the light portion of the smartphone 10 or other flash device 20; a light inlet hole 114 formed on a lower side of the light collecting panel 111, to which the light portion of the smartphone 10 or other flash device 20 brings into close contact or is inserted, and introducing the light into the light collecting housing 112; and a light outlet hole 115 formed in an upper surface of the light collecting housing 112, coupled to one end of the light delivery unit 120, and guiding the light collected by the light collecting housing 112 toward the light delivery unit 120.

The light collecting housing 112 allows the light introduced into the space through the light inlet hole 114 to be collected and then be delivered to the light delivery unit through the light outlet hole 115, wherein walls thereof which define the inner space together with a rear surface 111*a* of the light collecting panel 111 may be coated with a reflective material having high reflective efficiency or configured to be replaceable.

Here, the walls preferably include: a first lower inclined wall 112*a*, a second lower inclined wall 112*b*, and a third lower inclined wall 112*c* configured to reflect the light introduced into a lower section of the space through the light inlet hole 114 to an upper section of the space; a first upper inclined wall 112*d*, a second upper inclined wall 112*e*, and a third upper inclined wall 112*f* configured to reflect the light, which is not delivered to the light outlet hole 115 among the light reflected to the upper section of the space through the first lower inclined wall 112*a* to the third lower inclined wall 112*c*, to the lower section of the space; and a first intermediate wall 112*g*, a second intermediate wall 112*h*, and a third intermediate wall 112*i* located between the light inlet hole 114 and the light outlet hole 115.

Accordingly, the light collecting housing 112 has a high reflection efficiency due to the first lower inclined wall 112*a* to the third lower inclined wall 112*c*, the first upper inclined wall 112*d* to the third upper inclined wall 112*f*, and the first intermediate wall 112*g* to the third intermediate wall 112*i*, such that the light introduced through the light inlet hole 114 from the smartphone 10 or other flash device 20 can be collected in the space and then delivered to the light delivery unit 120 through the light outlet hole 115. In addition, by radiating more vivid light from the radiation unit 130, the cheering effect can be maximized.

The mounting clamp 113 is installed on the front of the light collecting panel 111 as a means for mounting or holding the light collecting panel 111 on the light portion of the smartphone 10 or other flash device 20, and may include: a clamp pin 113*a* installed on the front of the light collecting panel 111 to be pivoted and restored by an elastic force; and holding parts 113*b* formed at a lower portion of the clamp pin 113*a* so that the clamp pin 113*a* is directly hung and mounted on the light portion of the other flash device 20, and the light portion is inserted into the light inlet hole 114.

At this time, the clamp pin 113*a* of the mounting clamp 113 may include a pair of clamp claws 113*c* and 113*d* facing each other, being rotated and restored by an elastic force about a center thereof.

That is, in the case of the mounting clamp 113, the pair of clamp claws 113*c* and 113*d* may be pivoted or rotated about a pivot axis so that the holding parts 113*b* move away from or come closer to the light inlet hole 114. In addition, at least one of the pair of clamp claws 113*c* and 113*d* may be rotated about a rotational axis so that the holding parts 113*b* are expanded or contracted.

Therefore, according to the mounting clamp 113, when mounting the light collecting panel 111 on the light portion of the smartphone 10, the holding parts 113*b* of the clamp pin 113*a* are pivoted and restored so as to move away from or come closer to the front of the light collecting panel 111, so that the light portion of the smartphone 10 is positioned between the light inlet hole 114 of the light collecting panel 111 and the holding parts 113*b* of the mounting clamp 113.

In addition, when mounting the light collecting panel 111 on the light portion of the other flash device 20, the pair of clamp claws 113*c* and 113*d* of the clamp pin 113*a* are rotated and restored so that the light portion of the other flash device 20 is inserted into the holding parts 113*b* while the holding parts 113*b* are expanded or contracted to each other.

Therefore, according to the light collection unit 110, the light introduced into the space through the light inlet hole 114 may be collected, and then the light may be delivered to the light delivery unit through the light outlet hole 115.

The light delivery unit 120 extends upward from an upper side of the light outlet hole 115 of the light collection unit 110 as a means for delivering the light collected by the light collection unit 110 to the radiation unit, and includes a light delivery tube 121 having a cylindrical structure in which one or more tubes having a predetermined length are separately connected in series, wherein the light delivery tube 121 has walls which are coated on the inside with a reflective material having high reflective efficiency, and may be configured to be replaceable.

Here, the light delivery tube 121 may have a structure in which both ends of one or more tubes are coupled with screws or a concavo-convex structure, and one end is inserted into the light outlet hole 115 and the other end is coupled to the radiation unit 130.

In addition, the light delivery tube 121 may have a semi-cylindrical shape other than the cylindrical shape. In this case, a plurality of semi-cylindrical-shaped tubes can be combined and used as a tool for Korean traditional Yut-game.

Therefore, according to the light delivery unit 120, the light collected by the light collection unit 110 may be delivered to a position spaced apart from the light collection unit 110 by a predetermined height and then radiated through the radiation unit 130. The radiation unit 130 can have a variable height, thereby improving portability and usability. In addition, by radiating more vivid light from the radiation unit 130, the cheering effect can be maximized.

The radiation unit 130 is installed at the end of the light transfer unit 120 as a means for emitting and radiating the light delivered by the light transfer unit 120 to an outside, and may have any one shape of rod, heart, star and nameplate shapes. The radiation unit 130 may have a configuration in which one end thereof is coupled to the other end of the light delivery tube 121 of the light delivery unit 120 in a screw or concave-convex structure.

Here, in the case of having the rod, heart or star shape, the radiation unit 130 may include: a coupling tube 131 whose one end is coupled to the other end of the light delivery tube 121; and a rod, heart, or star-shaped light emitting unit 134 which extends from the other end of the coupling tube 131 to diffuse the light delivered through the coupling tube 131.

In addition, in the case of having the nameplate shape or type other than the rod, heart and star shapes, the radiation unit 130 may include: a coupling tube 131 whose one end is coupled to the other end of the light delivery tube 121; a projection plate 132 which extends from the other end of the coupling tube 131 and is irradiated with the light delivered through the coupling tube 131; and a projection slide 133 which is inserted into an insertion slot 131*a* formed in the coupling tube 131 in a replaceable manner, and has a desired cheering phrase, name or design printed thereon so that the cheering phrase, name or design is projected onto the projection plate 132 by the light delivered through the coupling tube 131.

At this time, the inside of the coupling tube 131 may be coated with a reflective material having high reflective efficiency or configured to be replaceable.

In addition, the coupling tube 131 preferably further includes a diffusion lens for diffusing light.

Therefore, according to the radiation unit 130, through the configuration of light emitting units having various shapes and the nameplate-type projection plate 132, a user may selectively replace the light emitting unit with a desired light emitting unit to perform cheering, or a desired cheering phrase of the projection slide 133 may be projected onto the projection plate 132. Therefore, it is possible to cheer in various ways.

Hereinafter, the operation of the cheering tool structure having the above-described configuration will be described.

First, when the light portion of the smartphone 10 or other flash device 20 is brought into close contact with or inserted into the light inlet hole 114 of the light collecting panel 111 using the mounting clamp 113 of the light collection unit 110, light emitted from the light portion is introduced into the light collecting housing 112 to be collected Thereafter, the light collected in the inner space of the light collecting housing 112 is delivered toward the coupling tube 131 of the radiation unit 130 through one or more light delivery tubes 121 of the light delivery unit 120 connected to the light outlet hole 115.

Then, the light delivered to the coupling tube 131 of the radiation unit 130 is radiated through the light emitting unit 134 having any one shape of bar, heart and star shapes, or is projected onto the nameplate-type projection plate 132.

Therefore, according to the above description, it is possible to produce various cheering effects by delivering the light collected in the light collection unit 110 to the radiation unit 130 having various replaceable shapes and structures through the extendable light delivery unit 120 and radiating the light to an outside, in a state where the light collection unit 110 is mounted on the light portion of the smartphone 10 or other flash device 20.

While the present invention has been described with reference to the specific embodiments, various modifications may be made without departing from the scope of the present invention. Therefore, the scope of the invention should not be defined by the above-described embodiments, but should be defined by the claims and equivalents of the claims.

What is claimed is:

1. A cheering tool structure comprising:

a light collection unit 110 mounted on a light portion of a smartphone 10 or a flash device 20 to collect light emitted from the light portion;

a light delivery unit 120 which extends upward from an upper portion of the light collection unit 110 to deliver the light collected by the light collection unit 110; and a radiation unit 130 installed at an end of the light delivery unit 120 to radiate the light delivered through the light delivery unit 120, wherein the light collection unit 110 comprises:

a light collecting panel 111;

a light collecting housing 112 disposed on a rear surface of the light collecting panel 111 to define a predetermined space, and configured to receive, collect and deliver the light introduced from the light portion of the smartphone 10 or the flash device 20;

a mounting clamp 113 installed on the front of the light collecting panel 111 to mount or hold the light collecting panel 111 on the light portion of the smartphone 10 or the flash device 20;

a light inlet hole 114 formed on a lower side of the light collecting panel 111, to which the light portion of the smartphone 10 or the flash device 20 brings into close contact or is inserted, and introducing the light into the light collecting housing 112; and a light outlet hole 115 formed in an upper surface of the light collecting housing 112, coupled to one end of the light delivery unit 120, and guiding the light collected by the light collecting housing 112 toward the light delivery unit 120.

2. The cheering tool structure according to claim 1, wherein the light collecting housing 112 provides the space by a plurality of walls together with a rear surface 111*a* of the light collecting panel 111, wherein the walls comprise:

a first lower inclined wall 112*a*, a second lower inclined wall 112*b*, and a third lower inclined wall 112*c* configured to reflect the light introduced into a lower section of the space through the light inlet hole 114 to an upper section of the space;

a first upper inclined wall 112*d*, a second upper inclined wall 112*e*, and a third upper inclined wall 112*f* configured to reflect the light, which is not delivered to the light outlet hole 115 among the light reflected to the upper section of the space through the first lower inclined wall 112*a* to the third lower inclined wall 112*c*, to the lower section of the space; and a first intermediate wall 112*g*, a second intermediate wall 112*h*, and a third intermediate wall 112*i* located between the light inlet hole 114 and the light outlet hole 115.

3. The cheering tool structure according to claim 1, wherein the mounting clamp 113 comprises:

a clamp pin 113*a* installed on the front of the light collecting panel 111 to be pivoted and restored by an elastic force; and holding parts 113*b* formed at a lower portion of the clamp pin 113*a* so that the clamp pin 113*a* is directly hung and mounted on the light portion of the flash device 20.

4. The cheering tool structure according to claim 3, wherein the clamp pin 113*a* comprises a pair of clamp claws 113*c* and 113*d* facing each other, being rotated and restored by an elastic force about a center thereof.

5. The cheering tool structure according to claim 1, wherein the light delivery unit 120 comprises a light delivery tube 121 having a cylindrical structure in which one or more tubes having a predetermined length are separately connected in series; and the light delivery tube 121 includes one end coupled to the light outlet hole 115 and the other end coupled to the radiation unit 130, and has a cylindrical or semi-cylindrical shape.

6. The cheering tool structure according to claim 5, wherein the radiation unit 130 comprises:

a coupling tube 131 whose one end is coupled to the other end of the light delivery tube 121;

a light emitting unit 134 which extends from the other end of the coupling tube 131 to diffuse the light delivered through the coupling tube 131, and has any one shape of rod, heart and star shapes.

7. The cheering tool structure according to claim 5, wherein the radiation unit 130 comprises:

a coupling tube 131 whose one end is coupled to the other end of the light delivery tube 121;

a projection plate 132 which extends from the other end of the coupling tube 131 and is irradiated with the light delivered through the coupling tube 131; and a projection slide 133 which is inserted into an insertion slot 131*a* formed in the coupling tube 131 in a replaceable manner, and has a cheering phrase, name or design printed thereon so that the cheering phrase, name or design is projected onto the projection plate 132 by the light delivered through the coupling tube 131.

* * * * *